Figure 3:
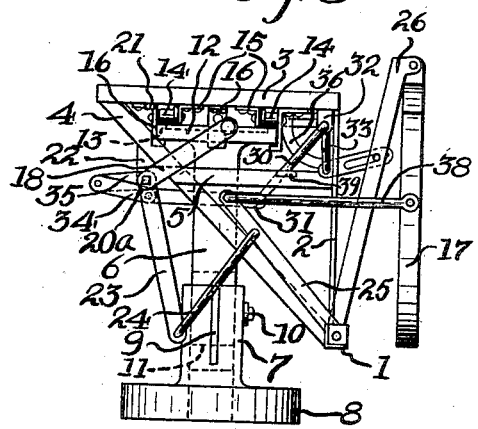

O. A. STROMWALL.
COMBINATION MILKING STOOL AND PAIL HOLDER.
APPLICATION FILED APR. 29, 1920.
1,376,050.
Patented Apr. 26, 1921.
2 SHEETS—SHEET 1.
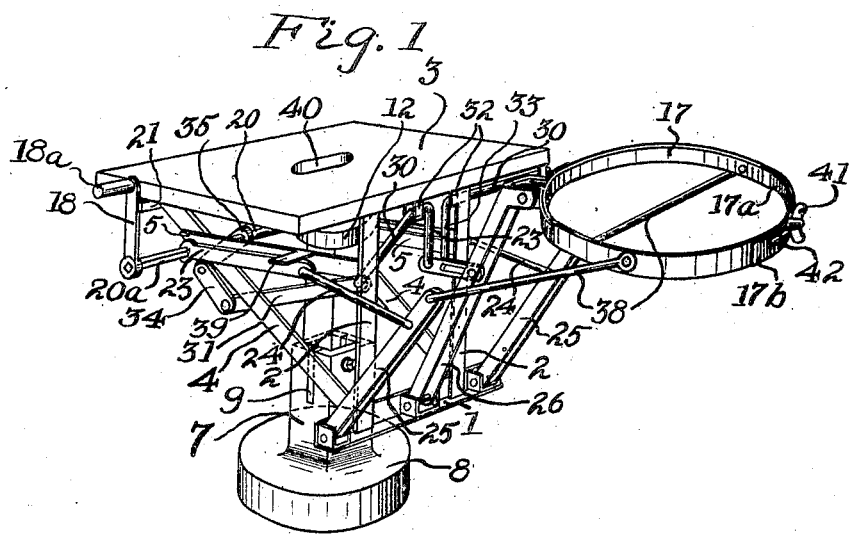
Inventor:
Oscar A. Stromwall,
by: John E. Stephen
Attorney.

UNITED STATES PATENT OFFICE.

OSCAR A. STROMWALL, OF FORESTON, MINNESOTA.

COMBINATION MILKING-STOOL AND PAIL-HOLDER.

1,376,050.    Specification of Letters Patent.    Patented Apr. 26, 1921.

Application filed April 29, 1920. Serial No. 377,488.

*To all whom it may concern:*

Be it known that I, OSCAR A. STROMWALL, a citizen of the United States, residing at Foreston, in the county of Mille Lacs and State of Minnesota, have invented new and useful Combination Milking - Stools and Pail-Holders, of which the following is a specification.

My invention relates to improvements in combined milking stools and pail holders.

Its object is to produce a seat and pail support which may be quickly adjusted for milking and removal from milking position.

A further object is to make such a device revoluble upon a central post in order that a person engaged in milking may more easily protect himself and the pail against the movement of restless or vicious animals and to facilitate change of position.

A further object is to provide such a device with means for extending the pail holder beneath the animal to be milked.

Another object is to provide such a device with adjustable means to adapt it for use with cows having low or high udders.

In the accompanying drawings Figure 1 is a perspective view of my improved combination milking stool and pail holder with the pail support extended in milking position; Fig. 2 is a left side elevation of the same, Fig. 3 is a right side elevation with the pail support retracted; and Fig. 4 is a left side elevation of the same with the pail support tilted to a lower position than the one shown in Fig. 2.

The frame of my device is rigidly secured to the seat 3 of the stool and comprises a horizontal angle iron 1 carried by vertical members 2 from the front edge of the seat 3 and joined by members 4 to the back edge of said seat 3 and horizontal braces 5, which extend between the vertical members 2 and members 4. The seat 3 is revolubly mounted upon a central post 6 the lower end of which is adjustably secured in the squared casing 7 of the base 8. Vertical adjustment of the central post 6 in the casing 7 is secured by means of slots 9 and a bolt 10. The bolt 10, as shown in Fig. 4, is provided with a nut $10^a$ and is slidable in a slot 11 in the central post 6. The slots 9 permit the upper end of the casing 7 to bend and grip the central post 6 when the nut $10^a$ is tightened. Thus by loosening the nut $10^a$, the seat 3 of the stool may be placed at any desired height and secured by tightening said nut. The upper end of the central post 6 is formed with an annular flange 12, (Figs. 2, 3, and 4) having an annular lip 13 on its upper surface to bear against the periphery of rollers 14. The rollers 14 are mounted on brackets 15 and 16 which are rigidly secured to the under side of the seat 3. The brackets 15 and 16 extend below the flange 12 and engage the under side thereof in a manner to hold the lip 13 against the periphery of the rollers 14. The seat 3 and frame are thus revolubly mounted upon the central post 6.

Figure 4:
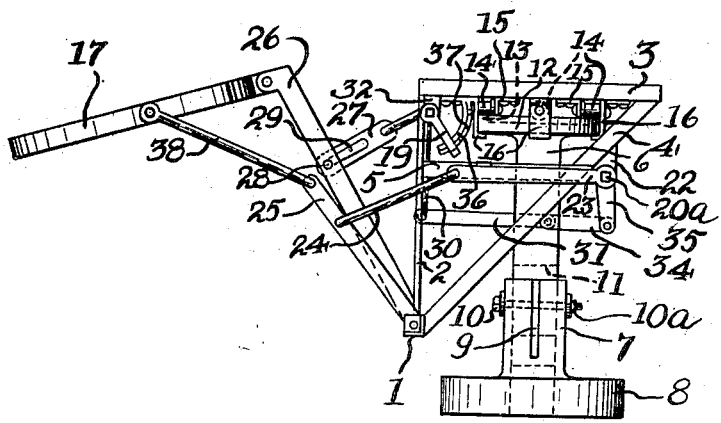

A movable pail supporting ring 17 is mounted in front of the seat 3 and adapted to be placed in either the position shown in Figs. 1 and 2 or that shown in Fig. 3 by a hand lever 18, located on the right hand side of the stool, and also to be tilted from the position shown in Fig. 2 to that shown in Fig. 4 by another hand lever 19.

The hand lever 18 is provided with a grip $18^a$ and mounted on a squared portion $20^a$ of a shaft 20 (Fig. 1). The hand lever 18 is sufficiently flexible to allow it to be bent away from the seat 3 to clear a projection 21 on the seat 3 when it is desirable to retract the ring 17 to the position shown in Fig. 3. The shaft 20 is revolubly mounted in bearings 22 formed on members 4 of the frame.

Two levers 23 are mounted on the squared portions $20^a$ of the shaft 20 near the braces 5 of the frame and pivotally connected by rods 24 to levers 25. Stops 39 for the levers 23 are formed on the braces 5 of the frame. The levers 25 are tiltably mounted at their lower ends on the angle iron 1 of the frame and pivotally joined at their upper ends rods 38 to opposite sides of the pail supporting ring 17. Said ring 17 is also pivotally connected at its side nearest the seat 3 to a standard 26 which is tiltably mounted at the middle point of the angle iron 1.

A link 27 supports the upper end of the standard 26 by means of a pin 28 the ends of which are secured in said standard, said pin passing through a slot 29 in said link 27. The end of the link 27 nearest the seat 3 pivots on a crank 33 formed in a rod 30. The bent rod 30 is pivotally connected to a link bar 31 at one end and is revoluble in bearings 32, rigidly mounted on the under side of the seat 3. Said rod 30 is formed with a crank 33 (Fig. 1) and its other end is squared to receive the hand lever 19.

Link bars 31 and 34 connect the lower end of the rod 30 with a bell crank 35 mounted on a squared portion 20ª of the shaft 20. A notched quadrant 36 (Figs. 2 and 4) is rigidly mounted beneath the seat 3 adjacent to the hand lever 19. The notches 37 in said quadrant 36 engage the lever 19 and hold it against the tendency of the weight of a pail in the supporting ring 17 to move said lever downward but permit said lever to be drawn upward when the ring 17 is removed from the retracted position Fig. 3 to the horizontal position, Fig. 2. The slot 29 in the link 27 permits the lever 26 to be folded against the seat 3 when the ring 17 is retracted and it is desired to move the stool about. A hand hole 40 in the seat 3 is provided to facilitate carrying the stool from place to place.

In operation, the pail supporting ring 17 being extended in the positions shown in Figs. 1 and 2 on 4, the hand lever 18 is behind the projection 21. To retract the ring 17 the lever 18 is grasped and bent away from the seat 3 until clear of said projection 21, when it is moved forward and downward. This tilts the levers 23 away from the stops 39 and by means of the rods 24, draws the upper ends of the levers 25 backward together with the rods 38 and folds the forward edge of the ring 17, until said levers, rods and ring are in the retracted position shown in Fig. 3. Operating the lever 18 also draws the upper end of the lever 26 backward by means of the bell crank 35, link bars 34 and 31, the bent rod 30 and the link 27. To raise the ring 17, the lever 18 is drawn upward and backward and placed behind the projection 21. In the raised position when a pail is in place within the ring 17 its weight tends to hold the levers 23 against the stops 39 in a manner to prevent the ring 17 from tilting.

To adjust the pail support to cows with lower udders, the ring 17 may be tilted to the position shown in Fig. 4, or an intermediate position, by the hand lever 19. Said ring 17 being in the horizontal position the lever 19 is sprung outward until free of the notch 37 and then moved downward over the quadrant 36. This turns the rod 30 in the bearings 32 and the crank 33 to alinement with the link 27, allows the lever 26 to tilt away from the seat 3, and lowers and tilts the ring 17. The rods 38 permit the ring 17 to tilt. In this position the link bars 31 and 34 straighten out to permit the lower end of the rod 30 to move forward.

When it is desired to have the ring 17 adaptable for pails of various sizes, I make said ring, as shown in Fig. 1, with over-lapping ends 17ª and 17ᵇ and perforate said ends with a slot 42 to receive a bolt and wing nut 41. The wing nut 41 may be loosened to make the ring 17 of larger or smaller diameter and then tightened to secure the end 17ª to the end 17ᵇ at the desired point.

Having described my invention what I claim as new and desire to protect by Letters Patent is:

1. In a device of the class described, a vertically adjustable base, a seat and frame revoluble on said base, an extensible and retractile pail support mounted in said frame, a lever to extend and retract said pail support and another lever to adjust said pail support as to height.

2. In a device of the class described, an adjustable base, a seat and frame revoluble on said base, an extensible and retractile pail support mounted on said frame, a shaft revoluble in said frame, a lever to extend and retract said pail support mounted on said shaft and another lever mounted in said frame, to adjust said pail support as to height.

3. In a device of the class described, a base, a central post adjustable vertically in said base, a seat and frame revoluble upon said central post, a pail supporting ring movably mounted in said frame and means for extending and retracting said ring, comprising a shaft revoluble in said frame, arms rigidly mounted on said shaft and a series of levers and rods connecting said arms with said ring.

4. In a device of the class described, a base, a central post adjustable vertically in said base, a seat and frame revoluble upon said central post, a pail supporting ring movably mounted in said frame, means for extending and retracting said ring, comprising, a shaft revoluble in said frame, arms rigidly mounted on said shaft and a series of levers and rods connecting said arms with said ring, and means for adjusting said ring as to height comprising, a rod mounted in said frame, a hand lever mounted on said rod, a notched quadrant mounted on said frame, a standard tiltably mounted in said frame and a link connecting said rod and standard.

5. In a device of the class described, an adjustable base, a seat and frame revoluble on said base, an extensible and retractile pail support mounted in said frame, a pair of levers tiltably mounted at their lower ends in said frame and connected by rods to said pail support at their upper ends, another lever tiltable in said frame and joined to said pail support at its upper end, means for tilting said levers to extend and retract said pail support and means for tilting one of said levers to adjust said pail support as to height.

6. In a device of the class described, a base, a central post adjustable vertically in said base, a seat and frame revoluble upon said central post, a pail supporting ring movably mounted in said frame, means for extending and retracting said ring, comprising a shaft revoluble in said frame and linkage between said shaft and ring, and means for adjusting said ring as to height, comprising a rod mounted in said frame, a hand lever mounted on said rod, a notched quadrant mounted on said frame, means for connecting said rod and ring, a bell crank on said shaft and link bars between said bell crank and rod.

7. In a device of the class described, a base, a central post adjustable vertically in said base, a seat and frame revoluble upon said central post, a pail supporting ring movably mounted on said frame and means for adjusting the height of said ring comprising a rod mounted in said frame, a hand lever mounted on said rod, a notched quadrant mounted on said frame and means connecting said rod and ring.

8. In a device of the class described, a base, a central post mounted on said base, an annular flange on the upper end of said post, an annular lip on said flange, a seat having a frame and a series of rollers mounted on its under side, said rollers being arranged to bear against the upper surface of said lip to revolubly mount said seat on said central post, an extensible and retractile pail support mounted on said frame, a lever to extend and retract said pail support and another lever to adjust said pail support as to height.

9. In a device of the class described, a base, a seat and frame revoluble on said base, an extensible and retractile pail support mounted on said frame, and means to extend and retract said pail support.

10. In a device of the class described, a base, a seat and frame revolubly mounted on said base, an extensible and retractile pail support mounted on said frame, means for extending and retracting said pail support, and means for adjusting said pail support as to height.

Whereof I have hereunto signed my name to this specification.

OSCAR A. STROMWALL.